F. A. PARKER.
Saw Set.
No. 13,227.
Patented July 10, 1855.
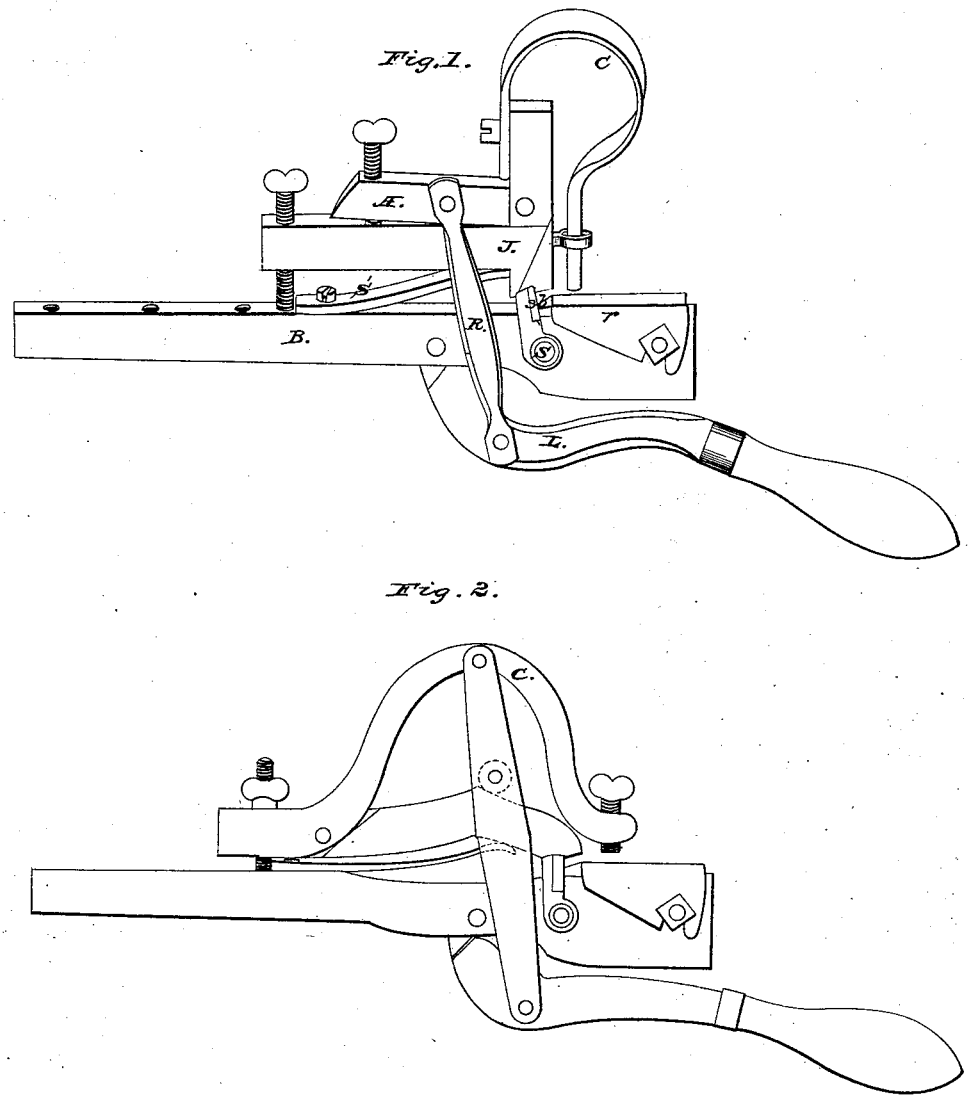

UNITED STATES PATENT OFFICE.

F. A. PARKER, OF SHAFTSBURY, VERMONT.

SAW-SET.

Specification of Letters Patent No. 13,227, dated July 10, 1855.

*To all whom it may concern:*

Be it known that I, F. A. PARKER, of Shaftsbury, in the county of Bennington and State of Vermont, have invented a new and Improved Saw-Set or Method of Setting Saws; and I do hereby declare that the following is a full and exact description thereof, reference being had to the accompanying drawings and the letters and figures of reference marked thereon.

The nature of my invention consists in providing a strong bed piece of proper length, to be confined to a bench or other firm fixture, having a bevel raised across the top over which the teeth are bent, the angle being regulated by the end of a spring which is brought down upon the saw with the saw or hammer when it strikes the tooth. Under the bottom of the bed piece, about one-third of its length from the fore end, a lever is hung on a strong pin or rivet, nearly at right angles, but bent up so that the handle may be brought up nearly parallel with the bed piece, at the front end. Directly above the bevel is suspended a saw or hammer the shank of which rests on a spring between it and the bed piece. Above the shank and attached to the upright part of the hammer or saw, is an adjusting bar, to the sides of which are attached arms or connecting rods, extending down and connecting with the lever below the bed piece, so that by a pressure on the handle of the lever the saw or hammer is brought down upon the tooth with sufficient force to fix it at the angle desired, the points of the teeth being brought down to a copper or other soft metal stop which may be adjusted to accommodate teeth of different lengths. But to enable others skilled in the art to make and use my said invention I will proceed to give a more particular description of its construction and operation, and shall have occasion to make reference to the following drawings, viz: Figure 1 is a side view of the set, with letters of reference; Fig. 2, an outline sketch.

B is the bed piece—a strong bar of sufficient length to be confined to a bench, or other firm fixture—having across the top about one-third of the distance from the front end, a bevel an angle over which the teeth are bent by the action of a lever hung in a mortise at the bottom, by which the teeth are bent; J, the saw or hammer—a bar bent at right angles, the horizontal part resting on a spring over the bed piece and adjustable by a screw at the back end—the vertical part standing over the bevel $b$, and having the lower end fitted at the proper angle to press on, and bend the teeth to the angle of the bevel; S, the stops—two pieces of copper or other soft metal attached to the bed piece (but movable) to stop saws having teeth of different length at the desired point on the bevel $b$; S', the spring attached to the top of the bed piece, to raise the saw J, sufficiently above the bevel to admit the saw teeth between them; $r$, the regulator—a case extending from the bevel $b$, nearly to the fore end of the bed piece, the fore end being raised, or lowered and confined by a screw to form with the bevel $b$, the exact angle to which the teeth are to be set; C, a circular stiff spring attached by a screw to the vertical part of the saw J, and bent over so that the lower end or shank of it, will press the back of the saw down onto the regulator $r$, at the same time the teeth are pressed by the saw; A, the adjusting bar—attached at the fore end to the vertical part of the saw, J, by a rivet, the back end being moved up or down by a screw, to adjust the space between the jaw and the bevel $b$, to the thickness of the saw; R, the connecting rods, or arms—being attached by rivets to the adjusting bar A, at the top and near the bend of the lever at the bottom, so that by a pressure on the lever the saw is brought to bear on the teeth with any desirable force; L, a crooked lever—hung at the bottom of the bed piece by a rivet, and attached by a rivet to the connecting rods A, so that by its movement the lower end of the connecting rods are made to vibrate across the rivet in the bed piece which is the point that gives the greatest pressure on the teeth, by the jaw, and as the rods R bend either way, the tooth is liberated and another tooth may be brought under the jaw.

For large teeth I have used as an equivalent a saw set like Fig. 2, differing little from the other, the more simple and less expensive.

I make no specific claims on the several parts of the saw set; but

What I do claim as my invention and desire to secure by Letters Patent is—

The arrangement of the circular spring C;—the adjustable bar A,—and the connecting rods R, substantially as herein specified.

F. A. PARKER.

Witnesses:
DENNIS J. GEORGE,
JOHN HASTINGS.